(12) United States Patent
Fenton et al.

(10) Patent No.: US 6,539,751 B2
(45) Date of Patent: Apr. 1, 2003

(54) BAFFLE MECHANISM FOR I.S. MACHINE

(75) Inventors: Frank Alan Fenton, Granby, CT (US); Russell Bruce Gottlieb, Canton Center, CT (US)

(73) Assignee: Emhart Glass S.A., Cham (CH)

( * ) Notice: Subject to any disclaimer, the term of this patent is extended or adjusted under 35 U.S.C. 154(b) by 0 days.

(21) Appl. No.: 09/798,379

(22) Filed: Mar. 2, 2001

(65) Prior Publication Data

US 2001/0007198 A1 Jul. 12, 2001

Related U.S. Application Data

(63) Continuation of application No. 09/309,006, filed on May 10, 1999, now Pat. No. 6,240,747, which is a continuation-in-part of application No. 08/965,673, filed on Nov. 6, 1997, now Pat. No. 5,931,982.

(51) Int. Cl.[7] .................................................. C03B 9/41
(52) U.S. Cl. .............................. 65/160; 65/209; 65/227; 65/229; 65/234
(58) Field of Search ............................... 65/29.1, 29.11, 65/29.15, 160, 208, 209, 227, 229, 234, 261, 300

(56) References Cited

U.S. PATENT DOCUMENTS 4,276,075 A * 6/1981 Olivotto ....................... 65/160
5,800,590 A * 9/1998 Pilskar ......................... 65/158

FOREIGN PATENT DOCUMENTS

WO 94/22776 * 10/1994
WO 94/22777 * 10/1994

* cited by examiner

Primary Examiner—Sean Vincent
(74) Attorney, Agent, or Firm—Spencer T. Smith

(57) ABSTRACT

An I.S. machine has a blankmold which is open at the top and includes inner and outer annular top sealing surfaces. Associated with the blankmold is a baffle including a body having a cup shaped portion closed with a vertical cylindrical bore open at the bottom, an annular bottom sealing surface for sealingly engaging the blankmold outer annular top sealing surface, and a top having a hole. A tubular sleeve communicates with the hole and extends vertically upwardly from the top of the body. A piston has a cylindrical head including a top surface, a cylindrical sealing surface and an annular bottom sealing surface having a plurality of radial notch means across the bottom thereof. A tubular rod extends vertically upwardly from the top surface for slidable displacement in the tubular sleeve, and a collar is secured to the top of the rod. A spring located between the collar and the cup shaped portion urges the cylindrical head vertically upwardly to a position whereat the cylindrical head top surface engages the top of the cup shaped portion. The collar is pneumatically displaced vertically downwardly at a high pressure to bring the cup shaped portion annular surface into sealing engagement with the blankmold outer annular sealing surface. The pressure is then reduced so that a predetermined distance separates the cylindrical head annular bottom sealing surface and the blankmold inner annular sealing surface so that settle air can be introduced into the mold, and then the pressure is again raised to the high pressure for parison formation.

4 Claims, 2 Drawing Sheets

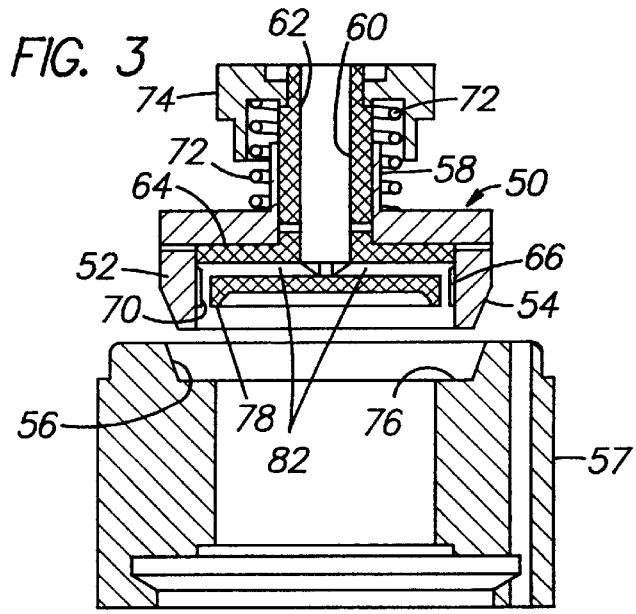
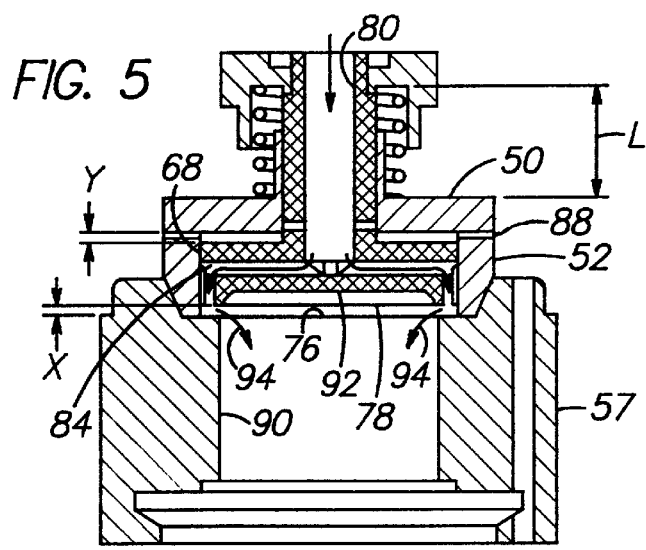
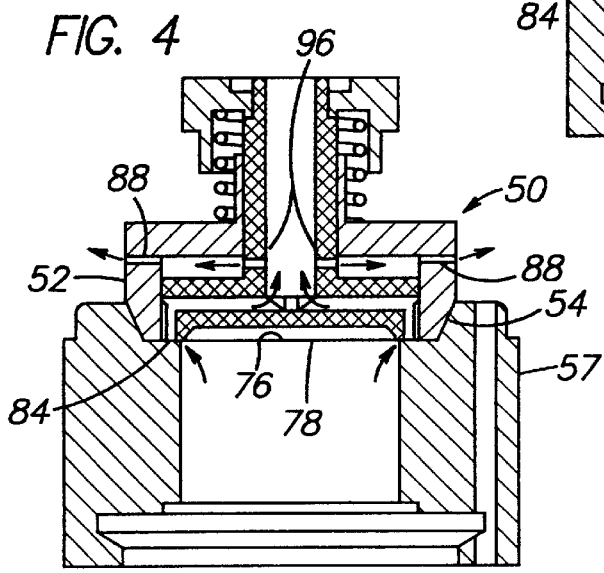

BAFFLE MECHANISM FOR I.S. MACHINE

This is a Continuation Application of U.S. Ser. No. 09/309,006, filed May 10, 1999 now U.S. Pat. No. 6,240, 747, which is a Continuation In Part of U.S. Ser. No. 08/965,673, filed Nov. 6, 1997, now U.S. Pat. No. 5,931, 982, issued Aug. 3, 1999.

The present invention relates to machinery for manufacturing glass containers, such as an I.S. (individual section) machine, and more specifically to a baffle mechanism for that machine which closes the open top of a blank mold at the blank station to define an escape path for air within the mold during parison formation.

BACKGROUND OF THE INVENTION

An I.S. (individual section) machine has a plurality of identical sections (a section frame in which and on which are mounted a number of section mechanisms) each of which has a blank station which receives one or more gobs of molten glass and forms them into parisons having a threaded opening at the bottom (the finish) and a blow station which receives the parisons and forms them into bottles standing upright with the finish at the top. An invert and neck ring holder mechanism which includes an opposed pair of arms, rotatable about an invert axis, carries the parisons from the blank station to the blow station inverting the parisons from a finish down to a finish up orientation in the process. A bottle formed at the blow station is removed from the section by a takeout mechanism.

The blank station includes opposed pairs of blank molds. These molds are displaceable between open (separated) and closed positions. The blank mold is open at the top and a track delivers a gob, by gravity, down to a position vertically above the open mold. Where the bottle to be formed is not circular in cross section (square for example) a funnel, which has a square passage, can be displaced into position over the open top of the blank mold to direct the gob into the mold, slightly changing its shape in the process. With the gob in the blank mold, a baffle of a baffle mechanism can be displaced down onto the funnel to supply air under pressure to the blank mold to "settle" the gob in the blank mold. The funnel and baffle are then removed and the baffle is repositioned on top of the open blank mold. Now, either counterblow air is introduced into the mold to blow the gob into the mold (a blow and blow machine) or a plunger is advanced to press the gob into the mold (a press and blow machine). Air trapped between the outer surface of the gob and the inner surface of the blank mold will be forced out of suitable notches in the bottom surface of the baffle. When the parison has been formed, the baffle will be removed as the blank mold opens, and the parison will be transferred to the blow station. When a gob doesn't have to be shaped, the funnel may be dispensed with and the baffle may be immediately positioned on top of the blank mold to start the settling process.

In a state of the art baffle of this type, a central piston hangs from the bottom of the baffle to define a large central opening for settle air. When counterblow occurs the upward movement of the gob engages and pushes this piston upwardly to its home position where the bottom of the piston is flush with the bottom surface of the baffle. Bottles made in this way have a visible circular ridge on the bottom of the bottle and this is undesirable.

OBJECT OF THE INVENTION

It is accordingly an object of this invention to provide an improved pneumatically operated baffle mechanism.

Other objects and advantages of the present invention will become apparent from the following portion of this specification and from the accompanying drawings which illustrate in accordance with the mandate of the patent statutes a presently preferred embodiment incorporating the principles of the invention.

BRIEF DESCRIPTION OF THE DRAWINGS

Referring to the drawings:

FIG. 3 is an elevational cross sectional view showing a baffle above a blank mold of the I.S. machine;

FIG. 4 is a view similar to FIG. 3 showing a baffle engaging a blank mold in a first condition; and FIG. 5 is a view similar to FIG. 3 showing a baffle engaging a blank mold in a second condition.

BRIEF DESCRIPTION OF THE PREFERRED EMBODIMENT

Figure 1:
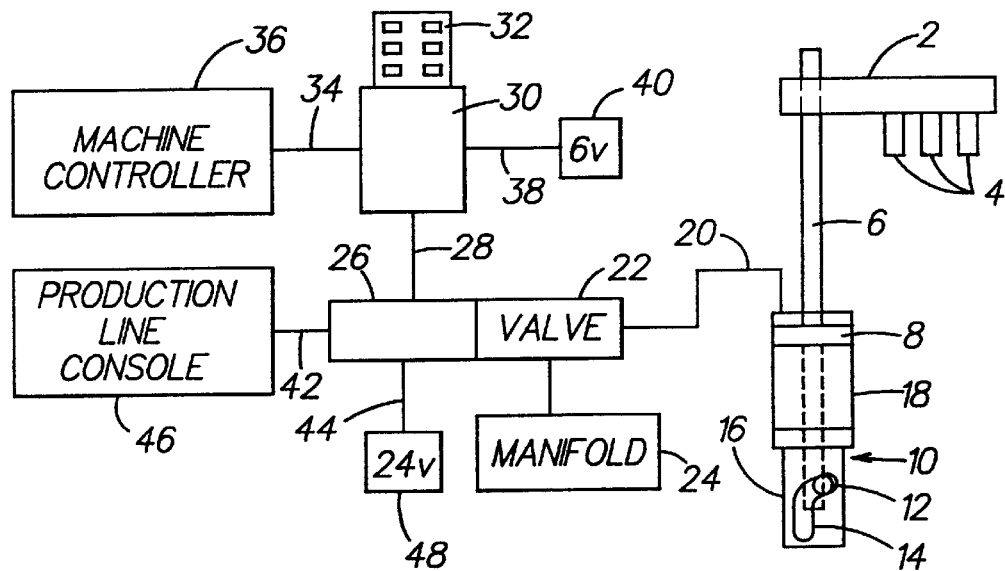
FIG. 1 shows, schematically, a baffle mechanism with a pressure regulating control valve made in accordance with the teachings of the present invention.

FIG. 1 shows schematically a pneumatically operated baffle mechanism for use in a section of an I.S. machine. A carrier arm 2 that supports three baffles 4 (a triple gob machine) is connected to a vertical actuating rod 6. The actuating rod 6 has attached to it a piston 8 and the actuating rod extends downwardly through the piston into a cam housing 10. The lower end of the actuating rod 6 includes a cam follower 12, in the form of a roller, which rides in a barrel cam 14 defined in the wall 16 of the cam housing 10. This actuating rod will be elevated and rotated during the uppermost portion of its elevation so that the baffle arm can be displaced between an elevated retracted position away from the center of the blank molds and a lowered advanced position where the axes of the blank molds will be coaxial with the axes of the closed blank molds and will be located on top of the blank molds. A pipe 20, which represents cylinder down air, leads from the cylinder 18 to a manifold 24 which provides a source of compressed air at a pressure of 3 to 4 bar.

An electronically settable pressure regulating control valve 22 which may be an electropneumatic valve, is located in the pipe 20 between the cylinder 18 and the manifold 24. The control valve 22 is an electrically controlled proportional valve and comprises an electronic control 26 connected by a wire 28 to a device 30 such as a potentiometer for defining a set point. Connected to the potentiometer 30 is a display panel 32. Wires 34 connect the potentiometer 30 to a machine controller 36 which acts as a timing control providing timing pulses to the potentiometer 30 which is powered by a power supply 40 via wires 38. The electronic control 26 of the control valve 22 is connected by wires 42, 44 to a display in the form of a production line console 46 and to a 24 volt power supply 48. The electronic control 26 is so constructed that on receiving a control voltage from the potentiometer 30 it translates it into a control signal which equates to a pressure.

Figure 2:
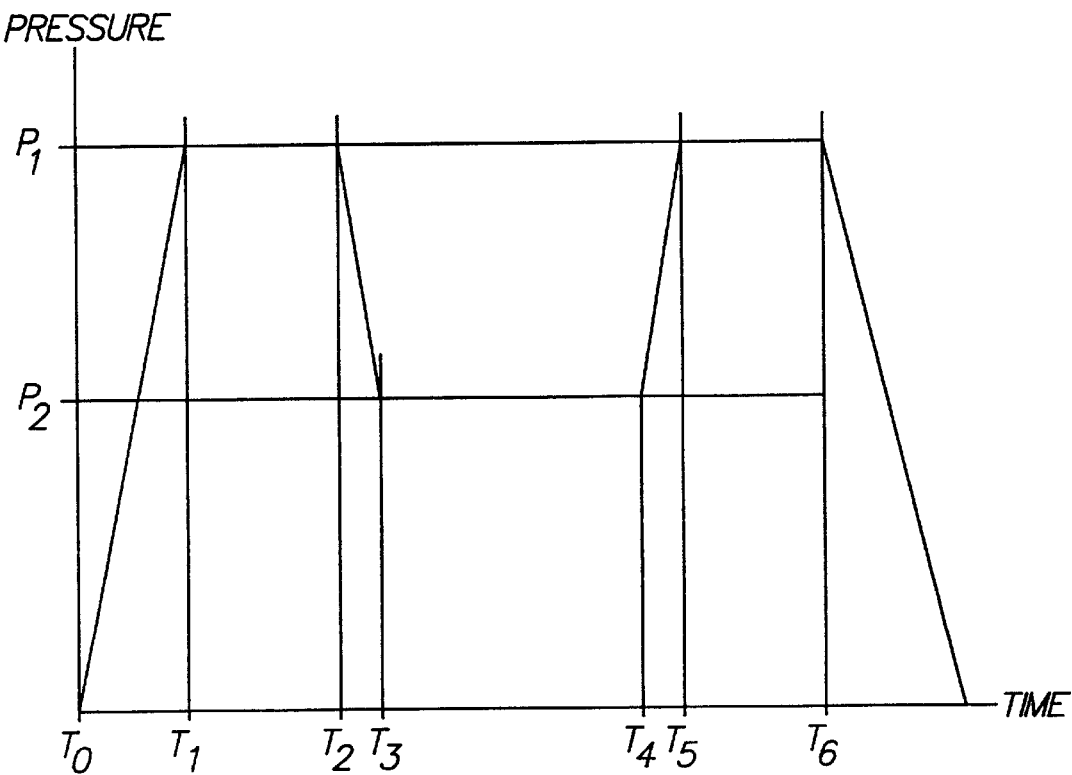
FIG. 2 is a graph of pressure versus time illustrating the operation of the control for the baffle mechanism according to the invention.

The production line console 46 displays the pressure versus time curve generally as shown in FIG. 2. Stored in memory in the production line console 46 is a desired curve and both the actual curve and the desired curve can be displayed so that adjustments of the potentiometer settings can be made to conform these curves.

The baffle of the baffle mechanism (FIG. 3) has a body 50 which includes a cup shaped portion 52 having an annular inclined sealing surface 54 extending around its open bottom for engaging and sealing a corresponding top surface 56 of a blank mold 57 open at the top. The body 50 also includes a vertical tubular sleeve portion 58 which defines a cylindrical bearing surface 60 for slidably receiving the rod 62 of a piston element 64. The cylindrical head 66 of the piston element 64 has an annular sealing surface 68 which is slidingly displaceable within the bore 70 of the cup shaped portion 52. A spring 72, which is located around the vertical tubular sleeve portion 58, is compressed between a collar 74 which is releasably secured to the carrier arm 2 and which is secured to the piston rod 62 and the top of the cup shaped portion 52, to maintain the top surface of the cylindrical head 66 in engagement with the adjacent surface of the cup shaped portion when the baffle is separated from the blank mold.

FIG. 2 shows the operation of the control with the resultant pressures supplied by the control valve 22 as controlled by the electronic control 26. The cycle begins with a first timing pulse at T0 from the machine controller 36. At T0, the control valve 22 is turned on and the control valve 22 is set to supply a high pressure P1 to the cylinder 18. From T0 to T1 the friction and inertia of the piston 8, the actuating rod 6, and the carrier arm 2 is overcome while the pressure reaches P1. From T1 to T2, this pressure provides the force required for quick and consistent operation to move the baffles down and onto the closed blank molds as shown in FIG. 4 where the inclined annular sealing surface 54 of the cup shaped portion engages the corresponding surface 56 on the blankmolds and the annular flat bottom surface 78 of the piston member 64 engages the corresponding surface 76 of the blank molds (these mating surfaces may also be inclined such as would be the case where loading into the blank mold is difficult and the top of the blank mold begins with an inclined annular surface to assist loading). At T2 the control valve is set to supply a second lower pressure P2 (which for example could be 25% less than P1) so that the force provided by the pressure on the piston 8 is enough to maintain surfaces 76 and 78 in engagement but is not enough to maintain surfaces 54 and 56 in engagement. P2 is selected so that the collar 74 will retract upwardly until the top of the spring 72 is compressed to a length "L" which will establish a separation X between surfaces 76 and 78 (FIG. 5). Now settle air introduced into the blank mold through the central bore 80 in the piston rod will pass through a number of radially extending holes 82 in the cylindrical head into a corresponding number of vertical holes 84 and through the annular gap between the annular bottom surface 78 of the cylindrical head and the top surface 76 of the blank mold (suitable holes 88 which connect the interior of the body to atmosphere assure that the cylindrical head can move smoothly relative to the body). When settle blow is complete (T4) and the gob is to be formed into a parison, the control will again set the pressure at P1, which is reached at T5 to further displace the collar downwardly 74 until the bottom annular surface 78 of the cylindrical head forcefully engages the top surface 76 of the blank mold to close the blank mold (FIG. 4). As the parison is formed (forced to fill the internal cavity defined by the inner surface 90 of the blank mold and the bottom surface 92 of the cylindrical head) air can escape through a number (four in the preferred embodiment) of small notches 94 defined in the bottom annular surface 78 of the cylindrical head (FIG. 6) into the vertical holes 84, through the radial holes 82 into the piston rod bore 80 and out through now exposed escape bores 96 into the space between the top of the piston and the cup shaped portion 52 and out the relief openings 88. The pressure P1 is held until T6 (which may be the end of the application of counterblow) when the second timing pulse occurs to turn the control valve off and the pressure goes to zero so that the mold equipment may be removed from the mold according to the barrel cam 14.

What is claimed is:

1. A mechanism for an I.S. machine comprising
    a structure displaceable between a first position and a second position,
    a pneumatically operated cylinder for displacing said structure from said first position to said second position,
    pneumatic supply means connected to said pneumatically operated cylinder including an inlet conduit and an electrically controlled proportional valve which upon receiving a variable input, will set a pressure which is a function of the input,
    a control for operating said pneumatically operated cylinder including
        means for supplying an input having a first value for said electrically controlled proportional valve for a first period of time selected so that a first pressure will be applied to the cylinder for a first predetermined period of time, and
        means for supplying a second input for said electrically controlled proportional valve for a second period of time selected so that a second pressure will be applied to the cylinder for a second predetermined period of time.

2. A mechanism for an I.S. machine according to claim 1, wherein said mechanism is a baffle mechanism and said baffle mechanism is displaced from the first position to the second position while said first input is supplied to said electrically controlled proportional valve.

3. A mechanism for an I.S. machine according to claim 2, wherein said control supplies said second input to said electrically controlled proportional valve after said baffle mechanism has been displaced to the second position and said second pressure is less than said first pressure.

4. A mechanism for an I.S. machine according to claim 3, wherein said control supplies said first input to said electrically controlled proportional valve for a third period of time after the expiration of the second selected period of time.

* * * * *